US012166256B1

(12) United States Patent
Danon

(10) Patent No.: US 12,166,256 B1
(45) Date of Patent: Dec. 10, 2024

(54) METHOD FOR SERVICING A DUPLEXER HAVING A RADIO FREQUENCY ASSEMBLY

(71) Applicant: Northcomm Technologies Group, Ltd., Plano, TX (US)

(72) Inventor: Mark Lawrence Danon, Plano, TX (US)

(73) Assignee: Northcomm Technologies Group, Ltd., Plano, TX (US)

( * ) Notice: Subject to any disclaimer, the term of this patent is extended or adjusted under 35 U.S.C. 154(b) by 0 days.

(21) Appl. No.: 18/413,834

(22) Filed: Jan. 16, 2024

Related U.S. Application Data

(62) Division of application No. 18/228,315, filed on Jul. 31, 2023, now Pat. No. 11,916,275.

(51) Int. Cl.
*H01P 1/213* (2006.01)
*H01P 1/205* (2006.01)
*H01P 1/208* (2006.01)

(52) U.S. Cl.
CPC ............ *H01P 1/2053* (2013.01); *H01P 1/208* (2013.01); *H01P 1/2138* (2013.01)

(58) Field of Classification Search
CPC ...... H01P 1/2053; H01P 1/208; H01P 1/2082; H01P 1/2084; H01P 1/205; H01P 1/201; H01P 1/2056; H01P 1/213; H01P 1/2136; H01P 1/2138; H01P 7/06; H01P 7/00; H01P 7/10; H01P 7/105; H01P 7/04
See application file for complete search history.

(56) References Cited

U.S. PATENT DOCUMENTS

| | | | |
|---|---|---|---|
| 6,255,922 | B1 | 7/2001 | Malmstrom |
| 2006/0038640 | A1 | 2/2006 | D'Ostilio |
| 2009/0121937 | A1 | 5/2009 | Kaegebein |
| 2021/0159581 | A1 | 5/2021 | Massa |

OTHER PUBLICATIONS

The Jack Daniel Company, Duplexers—An Introductory Tutorial, Last Updated Sep. 11, 2005, retrieved from https://www.repeater-builder.com/antenna/infro-to-duplexers.html on Apr. 26, 2023.
Portune, John E., The Cavity Duplexer, Jan. 2019, John Portune W6NBC, Santa Maria, CA.
Knowles Precision Devices, Product 5202 Product Line General Specifications, retrieved from https://www.knowlescapacitors.com/Tools/TrimmerTool/PartDetail?Product_ID=1765 on Apr. 10, 2023.
(Continued)

*Primary Examiner* — Stephen E. Jones
(74) *Attorney, Agent, or Firm* — Scheef & Stone, LLP; Mark D. Nielsen

(57) ABSTRACT

A method for servicing a duplexer having a cavity resonator defining an opening covered by an RF plate. The RF plate defines an opening through which a pass-band tuning pipe extends and is secured thereto. A collar is attached to one end of the pipe, and at least one steel set screw extends into the interior of the collar, the at least one end having a soft (e.g., brass) tip. A tuning plunger is slidingly positioned within the pass-band tuning pipe. A rod is attached to a first end of the tuning plunger and extends through the collar, the rod being fabricated from a material harder than the tip of the at least one set screw. The at least one set screw is configured for tightening down on the rod to secure the rod and tuning plunger in place. A trimmer capacitor is positioned in the RF plate.

13 Claims, 10 Drawing Sheets

(56) References Cited

OTHER PUBLICATIONS

Johanson Manufacturing Corporation, Air Trimmer Capacitor, 5202N mechanical drawing, Mar. 16, 2000, Boonton, New Jersey.
Bryson, W.B., Design of High Isolation Duplexers and a New Antenna for Duplex Systems, IEEE Transactions on Vehicular Communications, Marlboro, New Jersey, Mar. 1965.
EMR Corp., Base Station Antenna Duplexer, Product Specification Sheet, Phoenix, Arizona 2021.
Lieske, Sr, William F., Understanding, Maintaining & Re-Tuning Antenna Duplexers, EMR Corp., Phoenix, AZ.; downloaded Apr. 21, 2023—actual date of reference unknown.

METHOD FOR SERVICING A DUPLEXER HAVING A RADIO FREQUENCY ASSEMBLY

CROSS-REFERENCE TO RELATED APPLICATION

This patent application is a divisional of and claims priority to U.S. patent application Ser. No. 18/228,315 entitled "Duplexer Radio Frequency Assembly," filed Jul. 31, 2023, which application is incorporated in its entirety here by this reference.

TECHNICAL FIELD

The invention relates generally to radio communications systems and, more particularly, to duplexers that permit bi-directional (duplex) radio communication over a single path.

BACKGROUND

A duplexer is an electronic device that allows bi-directional (duplex) communication over a single path. In radar and radio communications systems, it isolates the receiver from the transmitter while permitting them to share a common antenna. Many radio repeater systems include a duplexer. Duplexers can be based on frequency (often a waveguide filter), polarization (such as an orthomode transducer), or timing (as is typical in radar). The present invention is directed to duplexers based on frequency.

During the past sixty or seventy years there have been numerous designs to create a duplexer with a metal chamber, commonly referred to as a cavity, and a pass-band tuning shaft, also referred to as a tuning plunger, positioned inside the chamber so that it can be moved up and down to tune the duplexer pass-band. The pass-band tuning shaft is typically threaded so it must be turned either clockwise or counter-clockwise to move it up or down, but that tuning activity roughs up the surface of the pass-band plunger. That is because designs using rotating pass-band plungers inevitably create a rotational motion and, thereby mechanical friction, between the pass-band tuning plunger and beryllium copper contact fingers which electrically bond the plunger to the cavity body. Generally, beryllium copper contact fingers are machined to accommodate linear motion about the surface of the contact material. The essence of the contact finger is to apply sufficient pressure upon the plunger in order to promote good electoral conductivity. A plunger which is rotated within this arrangement will rapidly deteriorate both the plunger and the beryllium-copper contact fingers since the aforementioned contact fingers are intended primarily to accommodate linear motion. After a few cycles of tuning up and down, the shaft will exhibit deep scratches and wear marks, while also depositing metallic dust within the cavity. This byproduct of tuning on a threaded shaft will profoundly reduce the long-term serviceability of the cavity. Moreover, most duplexers are not designed to be disassembled by the end user. Therefore, servicing these devices has been a serious challenge.

One alternative way to move the pass-band tuning shaft up and down is to attach to one end of the shaft a smooth (i.e., unthreaded) rod which slides up and down with the shaft, and which may be locked in place when correctly positioned. A common way to lock the rod in place is to use a threaded collar which squeezes the smooth tuning shaft, something like a drill chuck which tightens down on the rod. Unfortunately, this locking arrangement lacks much holding power and is susceptible to detuning due to shock or vibration. Another shaft locking arrangement is to have a stainless steel set screw which is tightened and thereby urged into the side of the rod once tuning is completed. However, this arrangement roughs up the rod assembly. If the rod surface finish is damaged, it will become difficult to retune and move the tuning plunger through the axis of the metallic housing that holds both the shaft and the set screw. For such an arrangement to work, the aforementioned shaft/plunger housing must be loosely machined to avoid binding. However, a loose machining tolerance within this locking system may cause the cavity tuning values to change whenever one locks the rod into place. In addition, great care must be taken by persons tuning the cavity to avoid over-tightening the set screw arrangement in order to avoid damage to the assembly. A Canadian company, Sinclair Technologies, a manufacturer of duplexers, employs both (1) a split collar through which the rod passes and (2) a set screw design. When tuned, the rod is tightened in place with a nut that tightens the split collar and secures the rod in place. The problem with that is that one is not very strong while the other risks damage to the tuning rod.

Conventional duplexers also have other shortcomings. For example, they have a high insertion loss (i.e., the minimum amount of loss to the signal passing through a filter at a designated frequency), typically more than 1 dB of insertion loss. The greater the insertion loss, the less the output level and the greater the power dissipation and temperature rise of the filters. Further, high insertion losses may reduce the power capacity of a filter and generally increase the selectivity of cavity filters. (e.g., a filter band-pass might be +/−200 KHz at 1.5 dB insertion loss and +/−100 KHz at 2 dB insertion loss).

Many conventional duplexers, such as made in China or Canada (e.g., by Sinclair Technologies, Telewave, Comprod, and DB Spectra) are made from extruded aluminum which, while less expensive than copper, is prone to thermal instability and is less electrically conductive than copper. Thermal instability can have a significant negative effect on the tuning and functionality of a duplexer. To address thermal instability and increase electrical conductivity, duplexers made in America (e.g., by Phelps Dodge Corporation, EMR Corporation, DB Spectra, and Waycom) have been manufactured from copper sheet formed into the required shapes. The use of copper, which largely cures the problem of thermal instability, is associated with higher manufacturing costs. In addition to being more expensive than aluminum, copper is mechanically softer. Given that copper is much more expensive, manufacturers have typically used thin copper sheet (0.030 inches in thickness is common) to offset costs. However, this thinner, softer metal, while more conductive and more thermally stable, is susceptible to mechanical deformation when moved or installed, or packed and shipped. For mechanical stability, aluminum extrusions are more robust and reliable. What is needed for a better cavity is one which is made of copper but constructed in such a way, with such thickness, using solid rivets, solder, and stainless steel hardware in order to maintain greater mechanical strengths.

Still further, when capacitors are tuned in band-pass/band-reject duplexers that employ a screw style capacitor and nut arrangement like the style used in the Phelps Dodge 526 series and the EMR 526 series, a rod must be rotated with a screwdriver and then tightened down with a wrench to lock it in place. But when such a capacitor is tightened down with a wrench, the rejection notch moves a little which significantly affects the tuning, thereby increasing the time it takes to tune the unit generally. Consequently, the capacitor must be re-adjusted many times which can take an inordinate amount of time to do.

Many conventional duplexers are also difficult to tune because radio frequency ("RF") connectors atop the cavity are spaced too close together. Such close connector spacing makes it difficult to get one's fingers and/or tools around the connectors. Manipulating the connectors is necessary during both the tuning and the installation process. Inadequately spaced connectors further slow the tuning process and lead to installations where connectors may be insufficiently tightened because a tool cannot be placed into the aforementioned small space. Adding to the connector issue, most manufacturers have elected to use connectors which are mechanically pressed into the cavity housing. Such connectors cannot generally be repaired or replaced by end users.

In view of the foregoing, what is needed is a duplexer that has readily serviceable RF connectors, is more easily tunable, and has minimal insertion loss at the pass-band, maximal insertion loss at the reject-band, and is physically, functionally, and thermally stable, and, thus, has stable performance. In addition, such a duplexer would have key elements that can be easily disassembled by the end user for the purpose of repair, cleaning, and inspection. Disassembly should not necessitate special or sophisticated tools or techniques. Disassembly must not be destructive insomuch as tools such as drills would not be necessary to access the key repair elements. All key elements, including the cavity interior, the tuning capacitor, the loop element (also referred to as a coupling loop), RF connectors, pass-band plunger, and beryllium-copper contact rings, would be easily accessible.

SUMMARY

The present invention, accordingly, provides a duplexer having at least two (preferably six) cavity resonators, also referred to as cavities, each of which cavities are defined by walls, at least one of which walls define a cavity opening. A radio frequency ("RF") assembly containing key elements of the device covers the opening and is preferably secured thereto with screws that are fastened into the cavity chamber. First and second spaced-apart RF connectors are coupled to an RF plate and configured for receiving first and second co-axial cables carrying RF signals. The RF connectors are preferably adequately spaced to promote the use of proper tools while additionally using RF connectors which can be removed and replaced when necessary. Such a design is more serviceable while also promoting better tuning and installation best practices.

An RF junction bar connects the two RF connectors. A coupling loop then couples the RF junction bar to a trimmer capacitor positioned in the RF plate.

An assembly opening is defined in the RF assembly for receiving a pass-band tuning pipe extending through the hole and secured to the RF plate, wherein the pipe has a first end for positioning in the interior of the cavity, and a second end for positioning outside the cavity. A shaft-locking collar is attached to the first end of the pipe with at least one steel set screw having at least one end extending into the interior of the collar, the at least one end having a brass tip or other relatively soft tip. A tuning plunger is slidingly positioned within the pass-band tuning pipe and shaft-locking collar. A rod is attached to a first end of the tuning plunger and extends through the collar, the rod being fabricated from a material harder than the tip of the at least one set screw, the at least one set screw being configured for tightening on the rod to secure the rod and tuning plunger in place.

In a preferred embodiment of the invention, surfaces defining at least the interior of each cavity, including such surfaces of the RF assembly, are silver-plated. The shaft-locking collar assembly is preferably a brass bearing that holds the tuning shaft tightly and facilitates smooth linear motion. The collar assembly preferably contains the aforementioned set screws with brass tipped set screws preferably configured at a 90-degree angle which, when tightened, does not damage the shaft, and yet holds the shaft far more securely than the split lock collar design. The cavity resonator is preferably manufactured from 0.060-inch thick copper sheet. The rod is preferably manufactured from Invar® (i.e., FeNi36) or similar material with a relatively low coefficient of thermal expansion. The trimmer capacitor is preferably a Knowles-Johanson or similar type trimmer capacitor. The trimmer capacitor is preferably one of an air trimmer capacitor or a ceramic trimmer capacitor. The RF connectors are preferably N-type connectors.

To tune the duplexer pass-band, the tuning shaft is adjusted for a desired pass-band frequency and is secured thereto with brass-tipped set screws engaging the rod. The duplexer reject-band is then further tuned to the required frequency by adjusting the trimmer capacitor. This process is repeated for all the subsequent cavities.

A number of novel advantageous features are disclosed. For example, the RF assembly is a novel concept that facilitates and simplifies repair and serviceability of the unit. The RF connectors are spaced further apart to facilitate the use of torque wrenches. Still further, a pass-band rod and shaft-locking collar assembly is disclosed that does not have a destructive impact on the tuning rod. Still further, these features may be utilized with existing duplexer designs and even improve on the existing designs.

The duplexer includes the RF assembly preferably comprising, in one embodiment, a thick brass RF plate that gets plated in silver with a shaft that passes through it with a locking collar that secures the end of the rod with very soft brass tipped set screws that do not damage the rod. This allows the tuning plunger to be smooth and re-used many times without being replaced. This also allows for very minute changes in tuning which is necessary to achieve fine tuning. It also saves money because the rod does not have to be threaded. Finally, since the locking system does not destructively mark or damage the tuning rod, the shaft locking collar can be tightly machined such that the act of locking the collar does not disturb the tuning.

There are a number of unexpected advantages of the invention over conventional duplexers. For example, insertion loss at the pass-band is minimized at the pass-band more than expected. Tuning stability in view of thermal fluctuations, vibration, and mechanical deformation is improved due to the mechanical design of both the cavity and the RF assembly. The tuning plunger and attached rod may be re-used many times without the risk of damage that occurs when rotational, rather than linear, movement occurs. The shaft locking collar is further designed in such a way as to be retrofittable into most if not all duplexers of the "526" series design duplexers (EMR, Cellwave, Phelps Dodge, and RFS have all made the 526 series design), thereby allowing those duplexers to tune with greater ease while also replacing damaged pass-band plungers.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
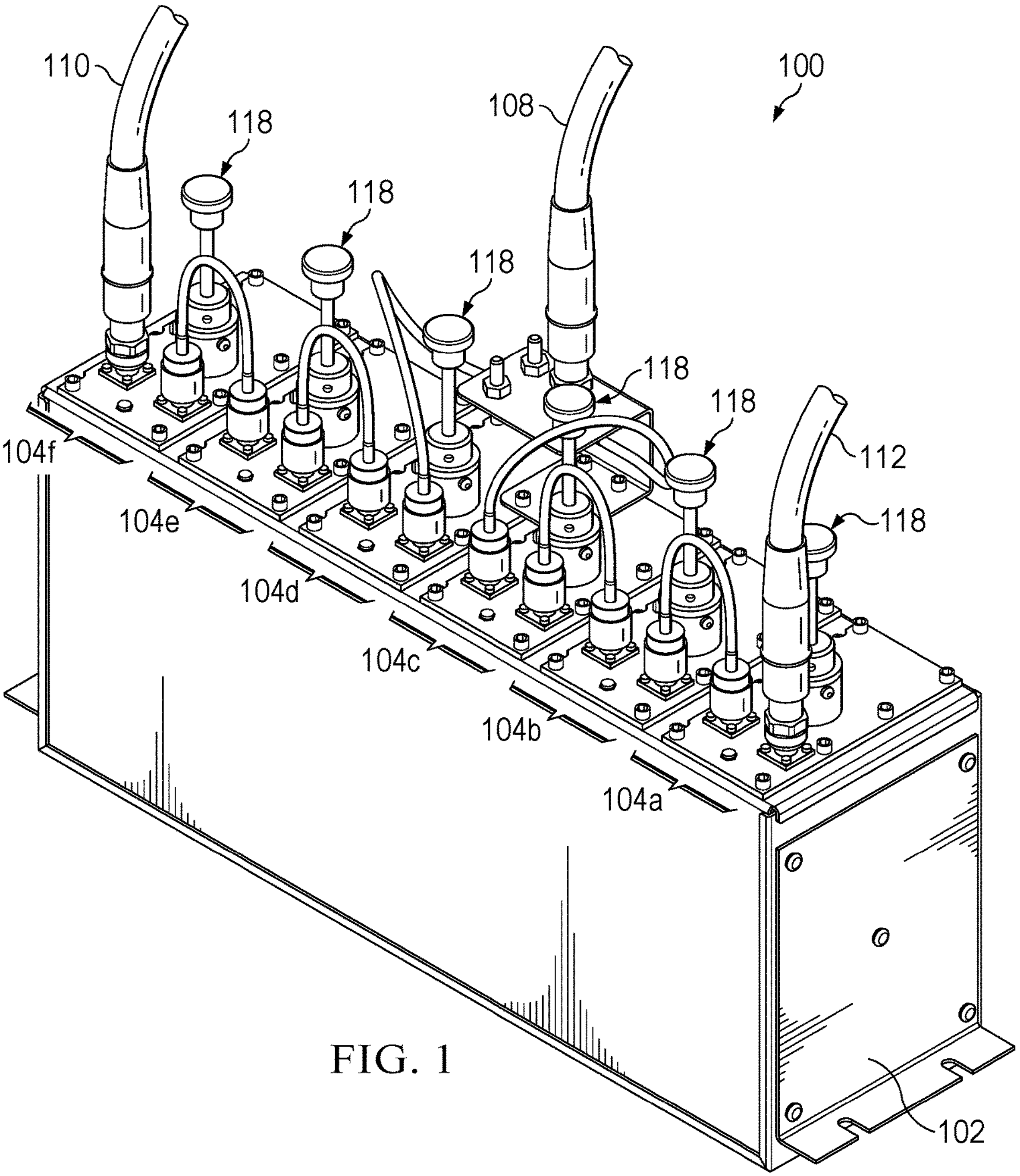
FIG. 1 exemplifies a perspective view of a duplexer embodying features of the invention.

In the discussion of the FIGURES, the same reference numerals will be used throughout to refer to the same or similar components. In the interest of conciseness, various other components known to the art have not been shown or discussed. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein. Additionally, as used herein, the term "substantially" is to be construed as a term of approximation.

Referring to FIG. 1 of the drawings, the reference numeral 100 generally designates a duplexer embodying features of the present invention. The duplexer 100 preferably includes a number of resonator cavities (also referred to herein simply as "cavities") exemplified as six cavities 104*a*, 104*b*, 104*c*, 104*d*, 104*e*, and 104*f* and referred to herein collectively as cavities 104. Co-axial cable 108 carries transmit signals to, and receive signals from, an antenna (not shown). The transmit signals are carried by co-axial cable 110 and the receive signals are carried by co-axial cable 112. The duplexer 100 includes a plunger/rod assembly 118 for each cavity, and an end plate 102. Duplexers are considered to be well-known and so will not be described in further detail herein except insofar as necessary to describe the invention.

Figure 2:
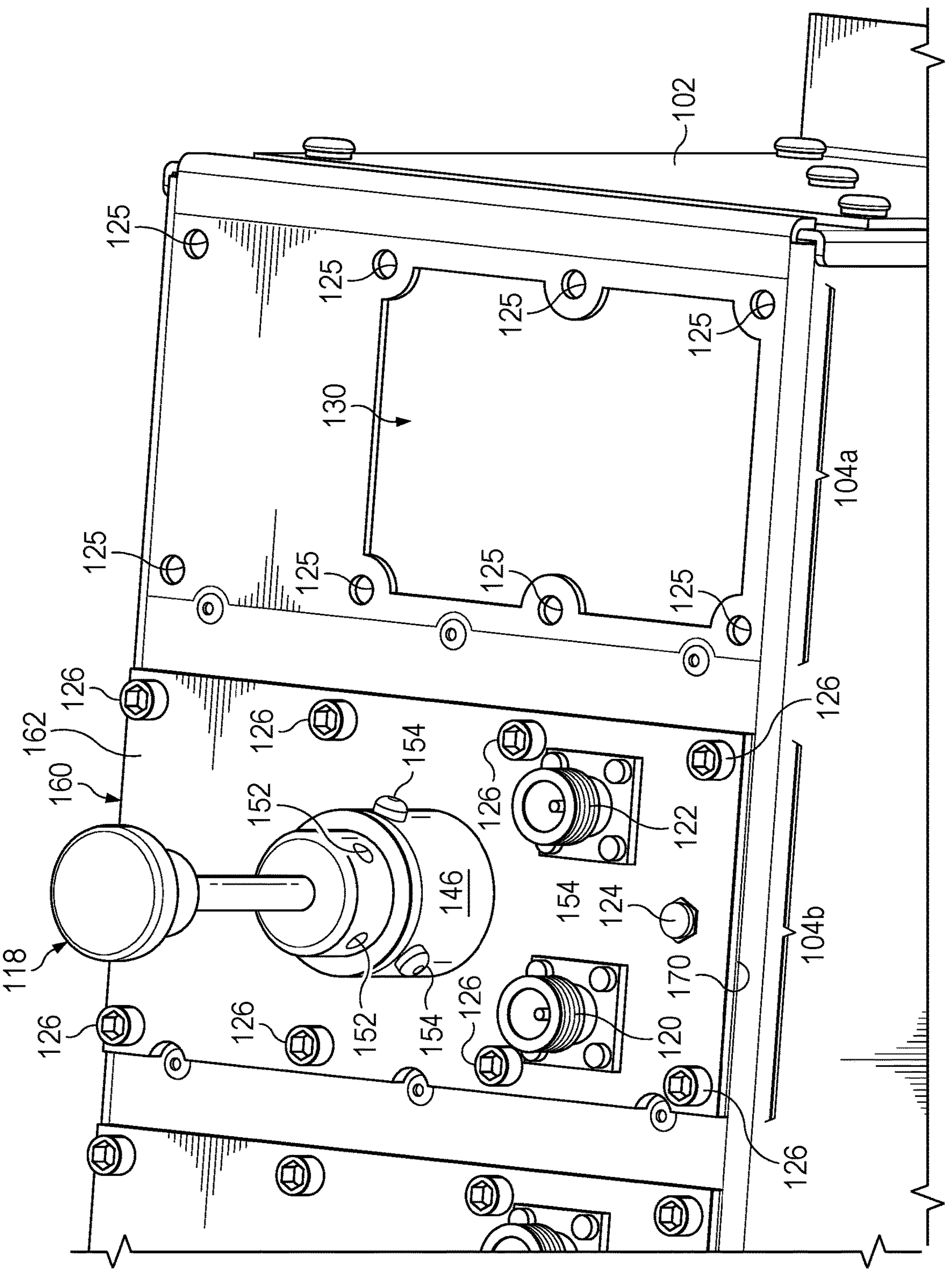
FIG. 2 exemplifies an opening in the duplexer of FIG. 1.

Referring to FIG. 2 of the drawings, there is generally exemplified a duplexer showing cavities 104*a* and 104*b*. Cavity 104*a* is open to show an opening 130, and cavity 104*b* is covered with a radio frequency ("RF") assembly 160 having an RF plate 162. Fasteners 126, such as screws, received by threaded holes 125, secure RF plate 162, and hence RF assembly 160, to duplexer 100. RF plate 162 includes first and second RF connectors 120 and 122, respectively, secured to the RF plate and configured for receiving respective first and second co-axial cables (not shown) carrying respective transmit and receive RF signals. A gasket 170 (described in further detail below) is preferably interposed between RF plate 162 and duplexer 100.

Figure 3:
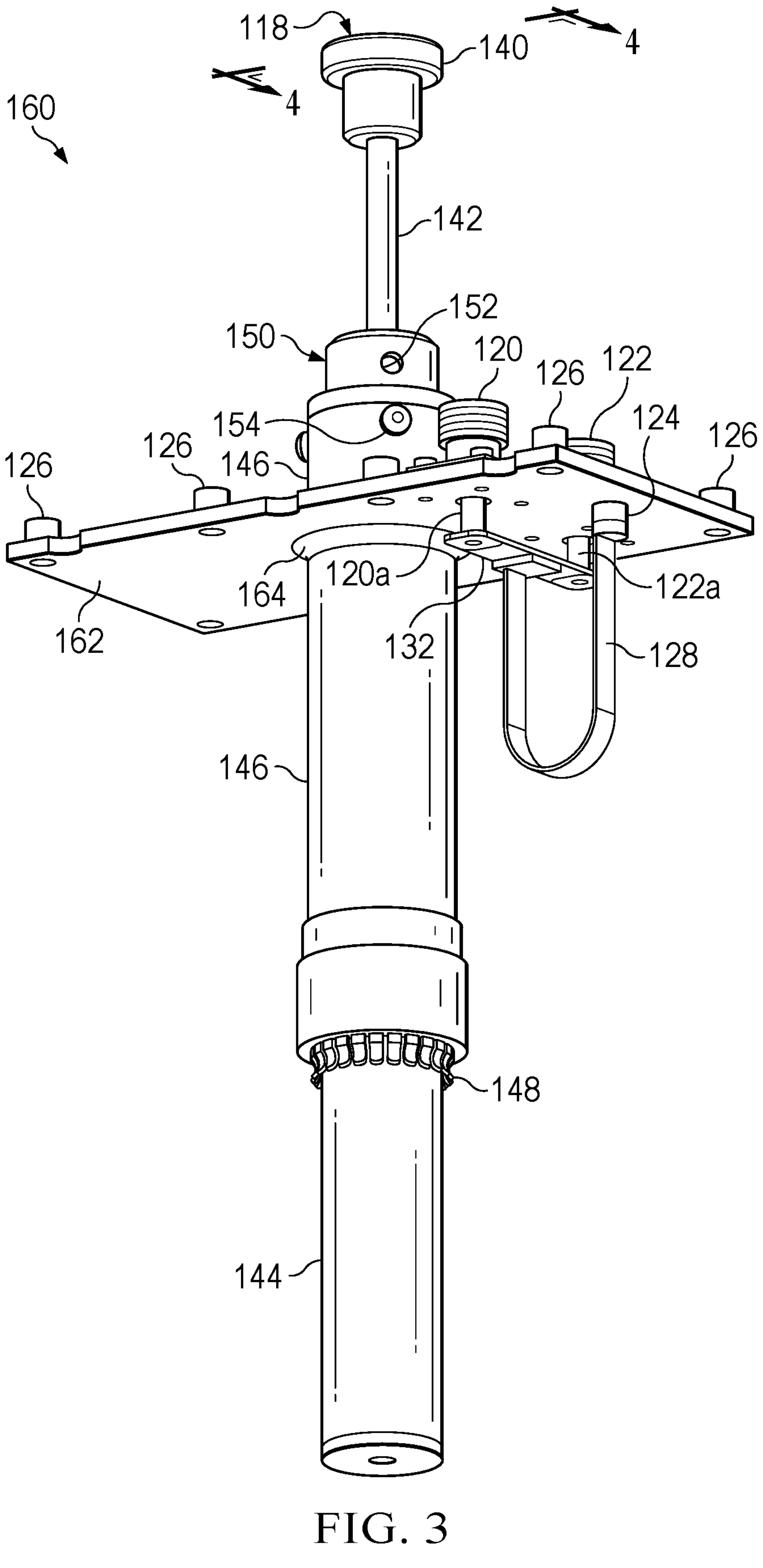
FIG. 3 exemplifies details of an RF assembly configured to fit in the opening of the duplexer of FIG. 2.
Figure 6:
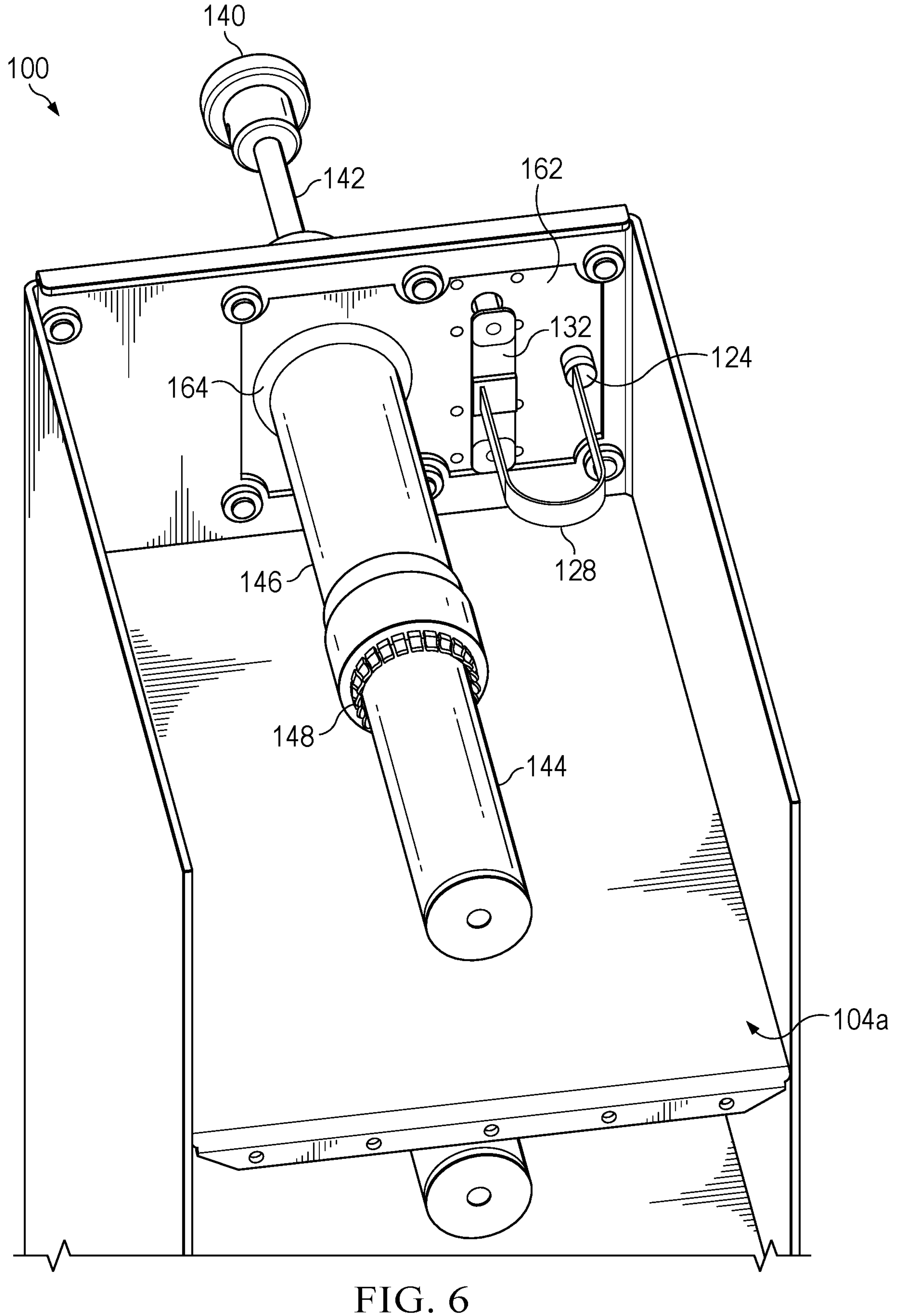
FIG. 6 exemplifies a tuning plunger and rod positioned within a cavity resonator with one wall removed.
Figure 7:
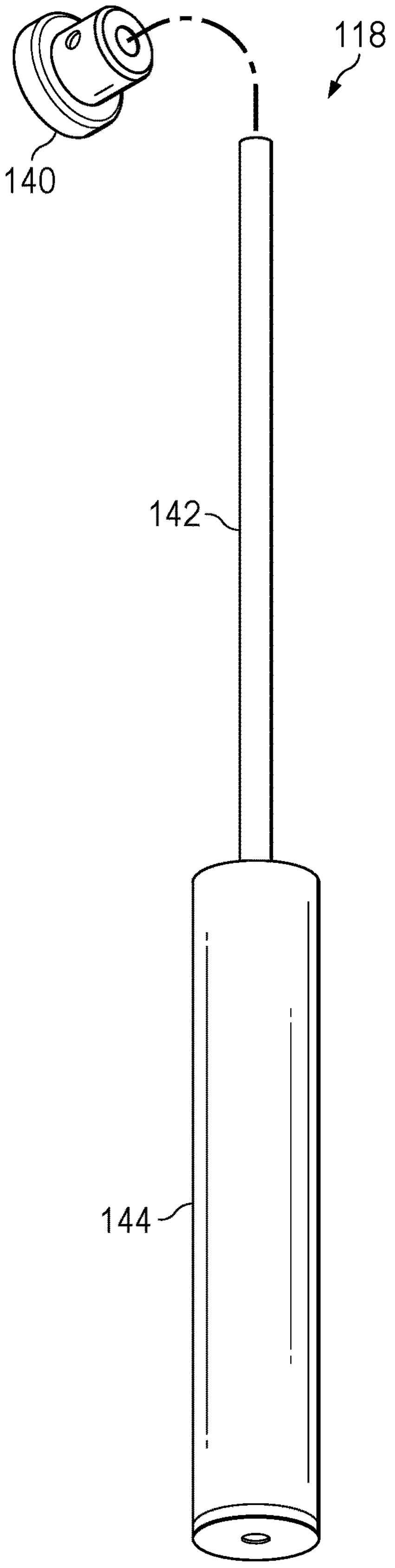
FIGS. 7-8 exemplify an assembly of the tuning plunger, rod and shaft locking collar of the duplexer of FIGS. 1-4.

As depicted more clearly in FIGS. 3 and 6, an RF junction bar 132 connects first and second RF connectors 120 and 122, and a coupling loop 128 couples RF junction bar 132 to a trimmer capacitor 124 positioned in RF plate 162. Trimmer capacitor 124 is preferably a Knowles-Johanson or similar type trimmer capacitor, and is preferably an air trimmer capacitor or a ceramic trimmer capacitor.

Figure 4:
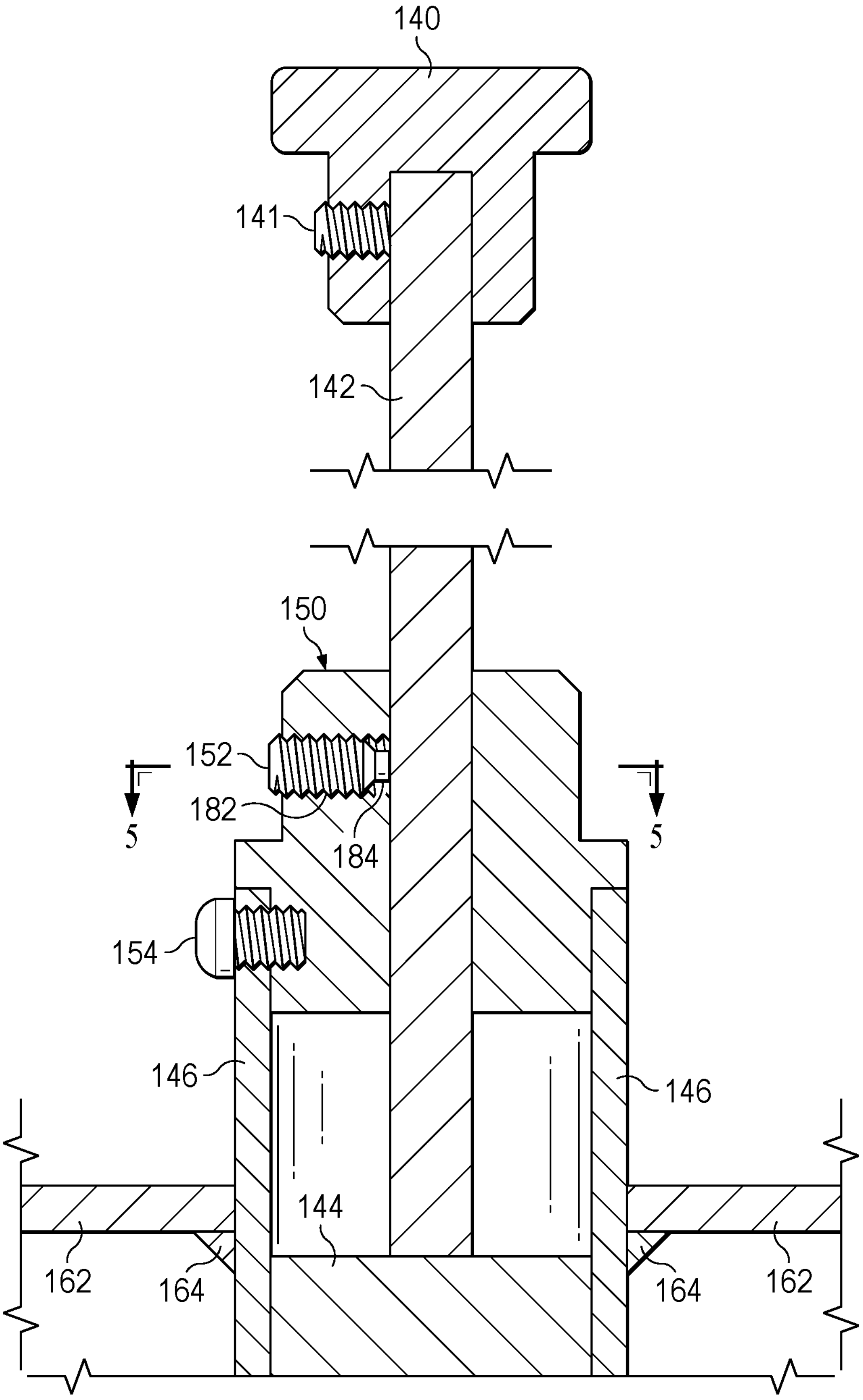
FIG. 4 is a cross-section taken along the line 4-4 of FIG. 3.
Figure 5:
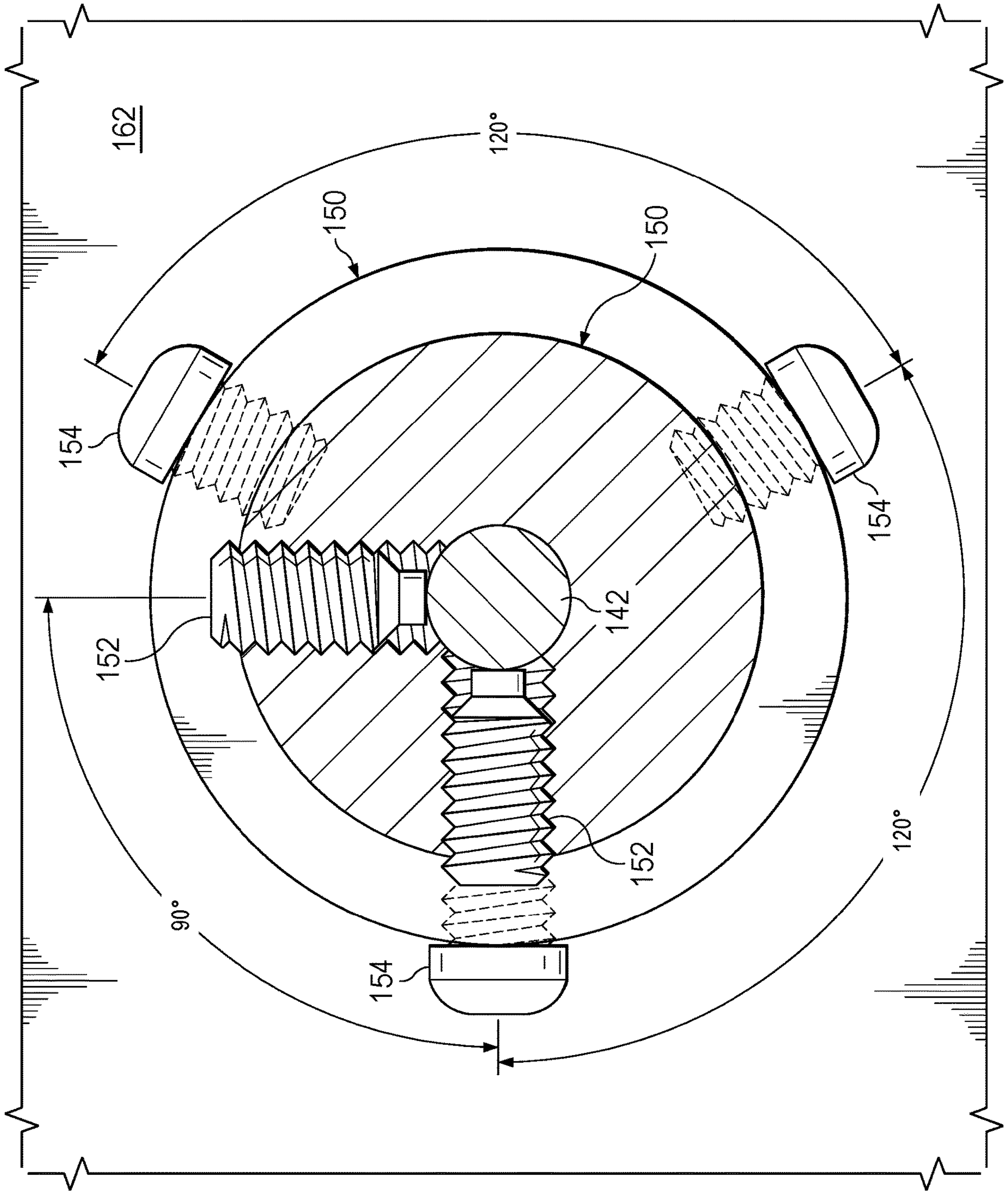
FIG. 5 is a cross-section taken along the line 5-5 of FIG. 4.
Figure 10:
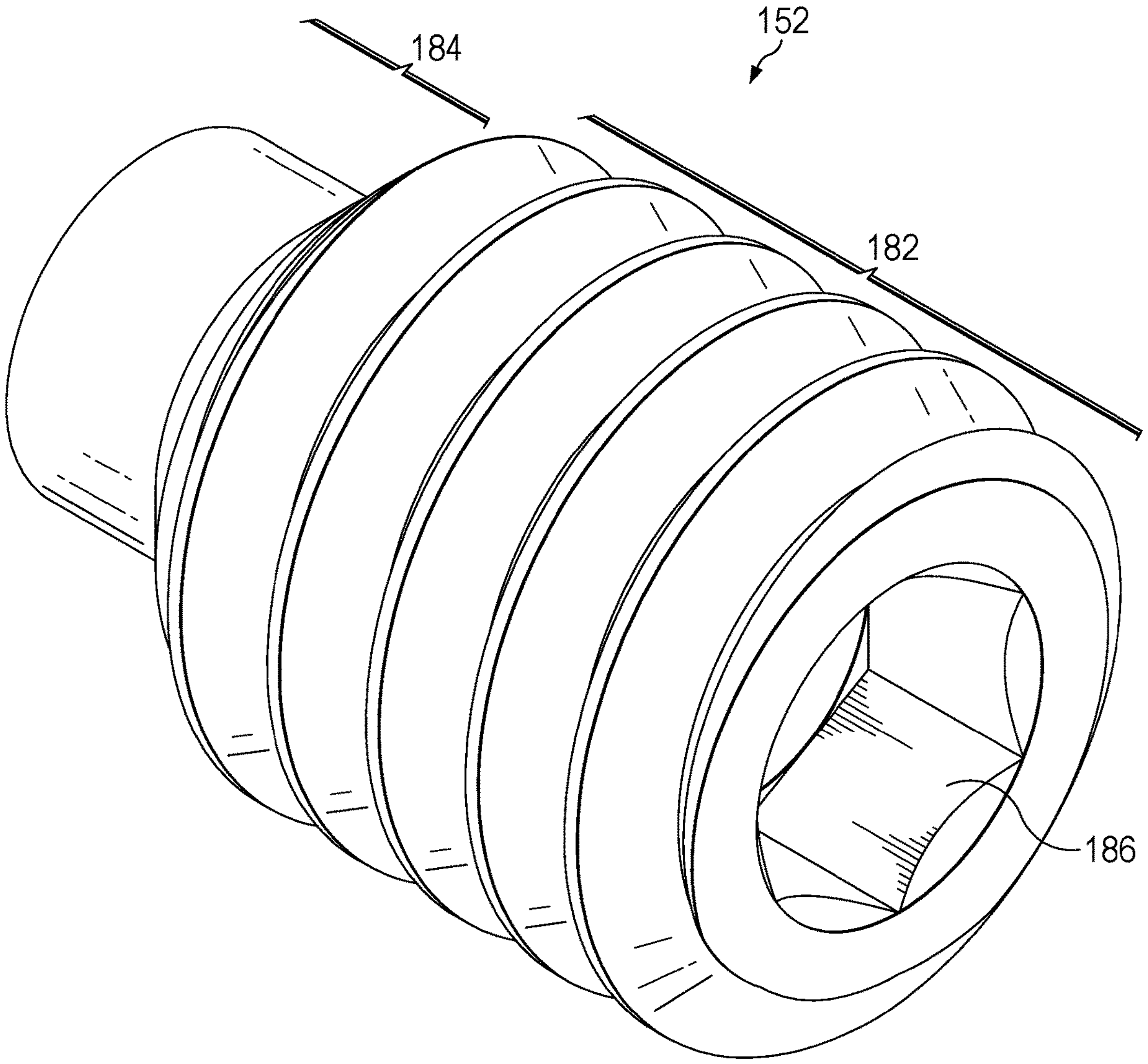
FIG. 10 exemplifies a perspective view of a set screw for engaging the plunger rod and securing the plunger in place.
Figure 11:
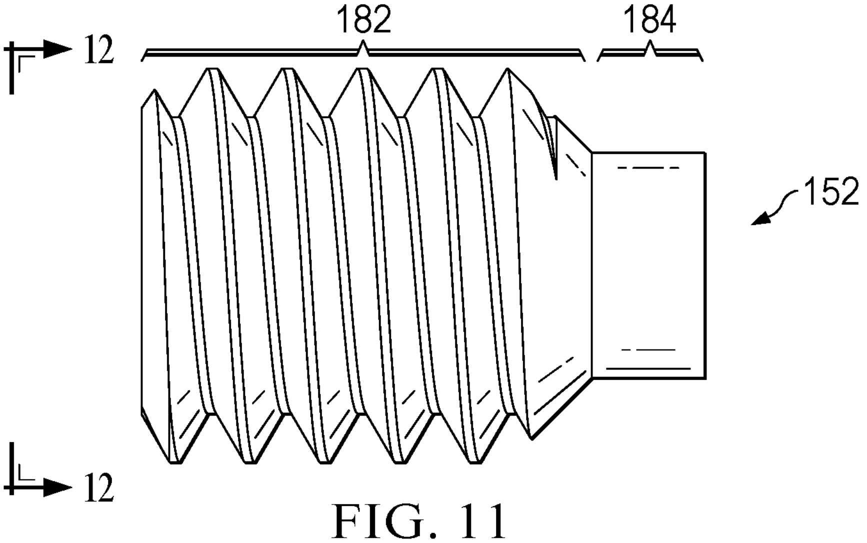
FIG. 11 is a side view of the set screw of FIG. 10.
Figure 12:
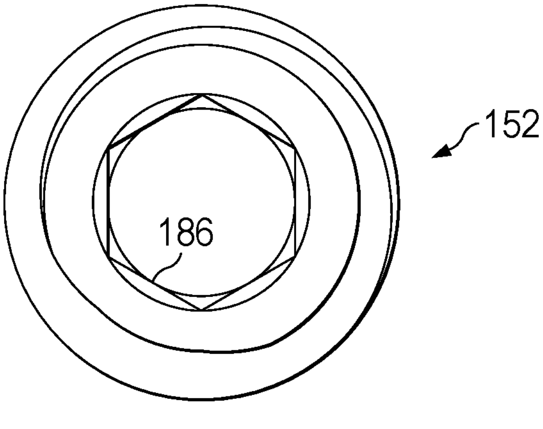
FIG. 12 is an end view of the set screw of FIG. 11 taken along the line 12-12 of FIG. 11.

A hole, not shown, but circumscribed preferably by solder 164, is defined in RF plate 162, and a pass-band tuning pipe 146 extends through the hole and is preferably secured to RF plate 162 by means of solder 164 or the like. Tuning pipe 146 includes fingers 148 to guide tuning plunger 144 (described below) as the plunger is slid linearly through the pipe. With reference also to FIG. 4, shaft-locking collar 150 is attached to an end of pipe 146 that is outside of a respective cavity, such as cavities 104*a* and 104*b*. At least one threaded hole is formed in collar 150 for receiving at least one set screw 152 having at least one end extending into the interior portion of the collar. With reference to FIGS. 4 and 5, in a preferred embodiment, two threaded holes are formed in collar 150 for receiving two set screws 152 spaced apart by 90° and having two ends extending into the interior portion of collar 150. As shown most clearly in FIGS. 10-12, set screw 152 includes a threaded portion 182 and a tip portion 184. Threaded portion 182 is preferably fabricated from a relatively hard material such as 18-8 stainless steel, and tip portion 184 is preferably fabricated from a softer material such as brass or the like. An end 186 of set screw 152, opposite tip portion 184, includes means for engaging a tool, such as an Allen key/wrench or the like, so set screw 152 may be tightened or loosened as described in further detail below. Referring back to FIGS. 4 and 5, pipe 146 preferably also defines at least one hole and collar 150 also defines at least one corresponding hole for receiving at least one screw 154 for securing collar 150 to tuning pipe 146. In a preferred embodiment, pipe 146 defines three holes spaced apart by 120° and collar 150 also defines three corresponding threaded holes for receiving three screws 154 for securing collar 150 to tuning pipe 146.

Figure 8:
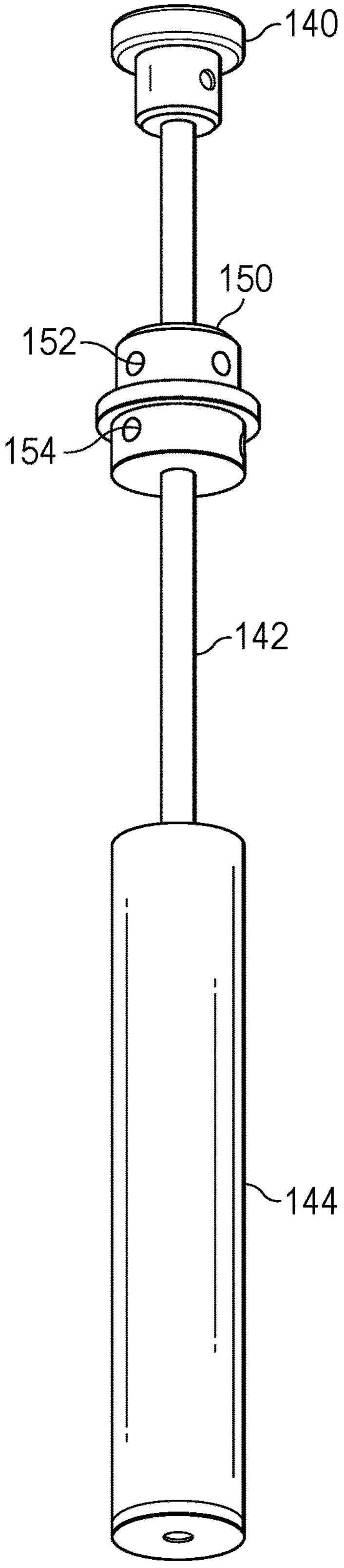

With reference to FIGS. 3, 4, and 6-8, tuning plunger 144 has a tuning rod 142 attached to one end of the plunger, and the plunger extends slidingly through the tuning pipe 146 and collar 150. Alternatively, as shown in FIG. 8, collar 150 may be positioned on rod 142 prior to insertion in pipe 146. As discussed above, the tip 184 of the at least one set screw 152 is fabricated from a material, such as brass, that is softer than the rod, so that the at least one set screw can be urged against the rod and secure the rod and tuning plunger in place with respect to a cavity, such as cavities 104*a* and 104*b*. Trimmer capacitor 124 is positioned in RF plate 162 to facilitate coupling to the coupling loop 128, discussed above. One or more fasteners, such as screws, rivets, or the like, secure RF plate 162 over opening 130 of the cavity resonator 104. Tuning rod 142 preferably includes a knob

140 secured at one end of the rod with a fastener, such as screw 141, to facilitate sliding tuning plunger 144 linearly in tuning pipe 146.

In one preferred embodiment, duplexer 100 comprises a body formed of a metallic material, the body comprising two or more compartments or cavities 104, commonly six cavities. RF connectors (preferably N-type connectors) and coax cables act as a waveguide to carry transmit and receive signals to and from each of the cavities.

The thermal stability of duplexer 100 is preferably enhanced by using thicker metallic "walls" for the body, which not only promotes thermal stability, but also provides mechanical rigidity as well, the latter being important because tuning a duplexer can be affected by deformities in the body or housing.

Regarding mechanical functionality, RF connectors 120 and 122 are provided for each cavity 104, each of which cavities must be tuned. The RF connectors, though, are too close together, making repair and other manipulations of the device for tuning purposes difficult and time-consuming. Thus, increasing the space between the RF connectors is paramount to a useful design, while also allowing for the use of torque wrenches and similar tools on the RF connectors.

There are several elements that may influence and improve the tuning of the duplexer. First, a tightly fit and well-machined pass-band tuning plunger, such as designated by reference numeral 144, is important to easy and accurate tuning. Additionally, a trimmer capacitor, such as designated by reference numeral 124, is a key element to the duplexer tuning process. A resonance circuit in each cavity must be tuned, and thus, optimizing the capacitor for the tuning function results in improved performance of the duplexer. In this instance, use of an air (or alternatively, ceramic) trimmer capacitor (e.g., by Knowles-Johanson) results in vastly improved tuning when compared to the original 526 series of duplexer design. Second, the ability to lock a tuning rod, such as designated by reference numeral 142, into place once the device or the individual cavities in the device are tuned can be enhanced by using multiple "set" screws, such as designated by reference numeral 152, with tips made from brass, a metal alloy, or similar soft metal that is softer than the rod 142 material that the screws tightly engage, so as not to mark up or scratch the tuning rod and deform it such that it will not fit into a retainer disk, also known as a shaft-locking collar, such as designated by reference numeral 150, that serves to secure the tuning plunger in place.

Further, surfaces of RF assembly 160 in the interior of cavity resonator 104 are plated with a conductive material, preferably silver. Cavity resonator 104 is preferably manufactured from copper. Tuning rod 142 is preferably manufactured from Invar®. Tip 184 of the at least one set screw 152 is preferably fabricated from a relatively soft material, such as brass. Trimmer capacitor 124 is preferably a Knowles-Johanson trimmer capacitor. Trimmer capacitor 124 is preferably one of an air trimmer capacitor or a ceramic trimmer capacitor. RF connectors 120, 122 are preferably one of N-type connectors, BNC connectors, TNC connectors, and 4.3/10 connectors.

In operation, duplexer housing 100 would first need to have a hole and bolt pattern that matches the footprint of RF plate 162. If not there, then such hole and bolt pattern would need to be cut. Then duplexer 100 is preferably connected to a spectrum analyzer/tracking generator (not shown), or more typically to a vector network analyzer (not shown), and tuning plunger 144 is raised and lowered until the insertion loss at the pass-band is minimized, and the return loss at the same pass-band is also maximized. Once the pass-band is adjusted, tuning plunger 144 is secured in place using set screws 152 on collar 150 that engage rod 142 on tuning plunger 144. Trimmer capacitor 124 is then adjusted such that the insertion loss at the reject-band is maximized and the return loss at the reject-band is minimized.

By implementing the key elements of duplexer 100 into RF assembly 160, thermal stability and resistance to vibration and deformation is improved. Tuning plunger 144 may be re-used many times. Moreover, the key elements of duplexer 100 which are subject to wear and damage can be easily removed, replaced, and serviced by the end user. The RF assembly concept further promotes periodic visual inspections of interior components. For example, duplexers that are struck by lightning may be quickly disassembled and visually inspected without the need of borescopes and special tools. Damaged capacitors, RF connectors, or elements which have become dirty and less conductive may easily be cleaned. Because tuning plunger 144 may be adjusted by being slid linearly in tuning pipe 146, i.e., without being rotated, it avoids being scratched from fingers 148, resulting in diminished performance.

It will be readily apparent to those skilled in the art that the general principles defined herein may be applied to other embodiments and applications without departing from the spirit and scope of the present invention. For example, pass-band tuning plunger 144 and tuning rod 142 in combination with locking collar 150 having at least one set screw 152 with a soft tip (i.e., softer than the rod, as discussed above) may be readily used in a model 526 duplexer without any modification to the duplexer. The plunger may then extend slidingly through the tuning pipe. Then the pass-band tuning plunger can slide up and down without getting scratched by brushes/contact fingers.

Figure 9:
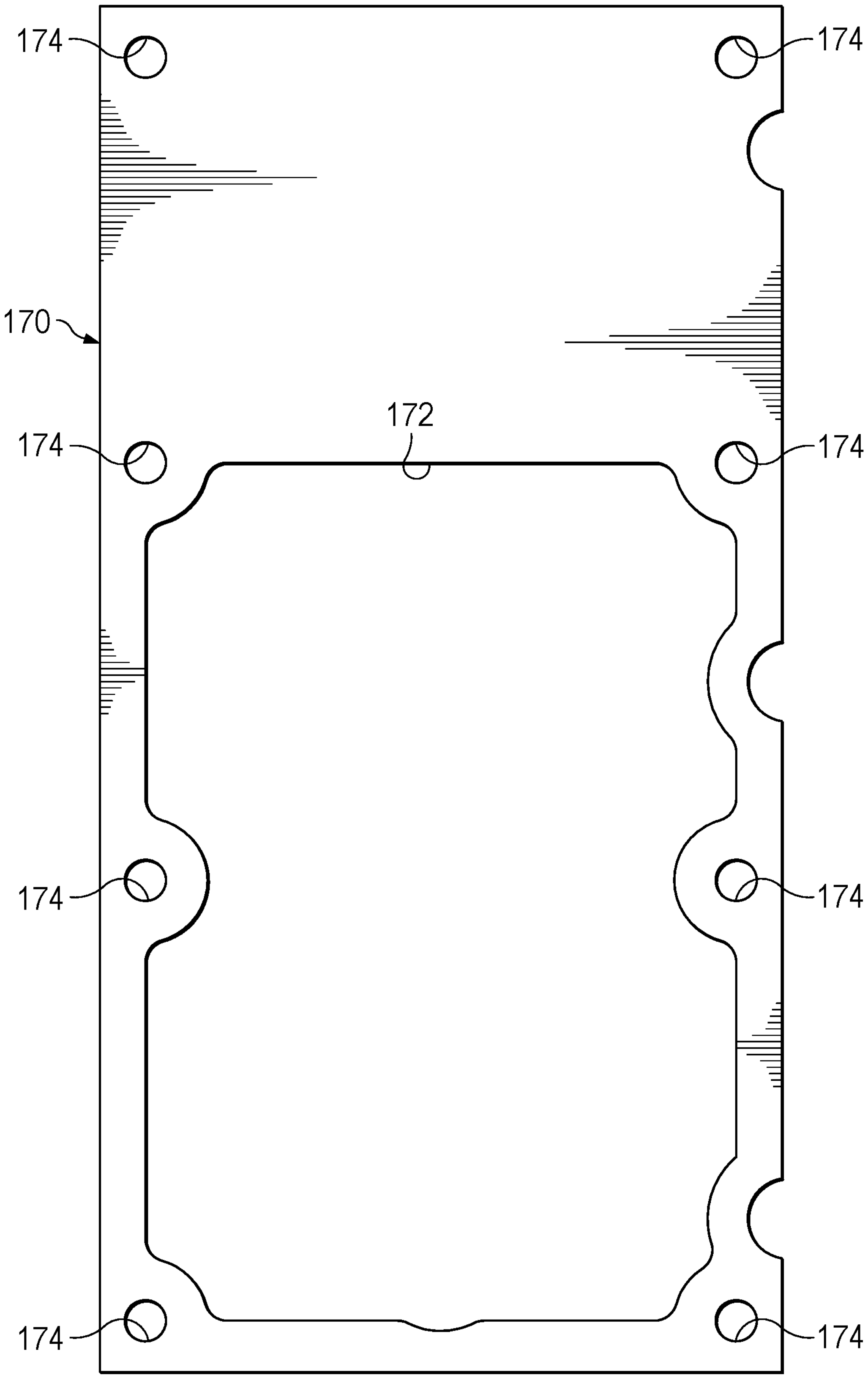
FIG. 9 exemplifies a gasket configured for placement between the RF plate and duplexer.

In another example, with respect to FIG. 9, a gasket 170 is preferably provided having a shape, including cut-out 172 and holes 174, that mimics the shape of RF plate 162, including opening 130 and holes 125, respectively. As shown in FIG. 2, gasket 170 is seated between the flat surfaces of RF plate 162 and duplexer 100. Gasket 170 preferably comprises an elastomeric material, such as rubber, a rubber mix, or neoprene type material with sharp pieces of metal mixed therein. The sharp pieces of metal preferably contact the metal of RF plate 162 and facilitate conductivity between RF plate 162 and duplexer 100. Alternatively, gasket 170 may be fabricated from a conductive elastomer, such as conductive rubber, neoprene, or the like, such as manufactured by Da/Pro Rubber, Inc. The elastomeric material will be spread out and inhibit entry into the duplexer cavities of air and other gases that can corrode and tarnish the duplexer and ultimately diminish the functionality and conductivity of duplexers over time. This is important because duplexer sites have doors that are opened and closed and air otherwise gets in which will, over time, corrode the metal in the duplexer. In addition, duplexer sites typically have batteries in them, or coupled to them, and those batteries emit corrosive gases that will also cause tarnishing and corrosion of duplexers, potentially destroying the electrical contacts on the duplexers and diminishing their functionality. Gasket 170 reduces the leakage of RF energy from between duplexer cavity 104. The gasket also makes the unit more serviceable and reduces the need for the cavity housing to be "perfectly" flat.

In a still further example, RF assembly 160 could also be modified into different shapes for other cavity designs. For example, some cavities are round. The RF assembly could then be made round rather than rectangular to match such a configuration.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A method for servicing a duplexer having a radio frequency (RF) assembly configured for fitting over an opening defined in a cavity resonator of the duplexer, wherein the RF assembly comprises:

an RF plate;

first and second RF connectors secured to the RF plate and configured for receiving respective first and second co-axial cables carrying RF signals;

an RF junction bar connecting the first and second RF connectors;

a trimmer capacitor positioned in the RF plate;

a coupling loop coupling the RF junction bar to the trimmer capacitor positioned in the RF plate;

a hole defined in the RF plate;

a pass-band tuning pipe extending through the hole and secured to the RF plate, the pipe having a first end and a second end;

a shaft-locking collar attached to the first end of the pipe, the collar defining an interior portion and at least one threaded hole for receiving at least one set screw having at least one end extending into the interior portion of the collar;

a tuning plunger having a rod attached to one end of the tuning plunger, the plunger extending slidingly through the tuning pipe and collar, wherein a tip of the at least one set screw is fabricated from a material softer than the rod, the at least one set screw being configured for tightening on the rod to secure the rod and tuning plunger in place; and one or more fasteners for securing the RF plate over the opening of the cavity resonator; and;

wherein the method comprises steps of:

adjusting the tuning plunger by raising and lowering it until the insertion loss at the pass-band is minimized, and the return loss at the pass-band is maximized;

securing the tuning plunger in place using set screws on the collar, which set screws engage the rod on the tuning plunger; and adjusting the trimmer capacitor until the insertion loss at the reject-band is maximized, and the return loss at the reject-band is minimized.

2. The method of claim 1 wherein the method further comprises the step of:

connecting via coax cables the duplexer to a spectrum analyzer/tracking generator; and the steps of adjusting further comprise:

adjusting the tuning plunger by raising and lowering it until the insertion loss at the pass-band as determined by the spectrum analyzer/tracking generator is minimized, and the return loss at the pass-band as determined by the spectrum analyzer/tracking generator is maximized; and adjusting the trimmer capacitor until the insertion loss at the reject-band as determined by the spectrum analyzer/tracking generator is maximized, and the return loss at the reject-band as determined by the spectrum analyzer/tracking generator is minimized.

3. The method of claim 1 wherein the method further comprises the step of:

connecting via coax cables the duplexer to a vector network analyzer; and the steps of adjusting further comprise:

adjusting the tuning plunger by raising and lowering it until the insertion loss at the pass-band as determined by the vector network analyzer is minimized, and the return loss at the pass-band as determined by the vector network analyzer is maximized; and adjusting the trimmer capacitor until the insertion loss at the reject-band as determined by the vector network analyzer is maximized, and the return loss at the reject-band as determined by the vector network analyzer is minimized.

4. The method of claim 1 further comprising positioning a gasket between the RF plate and the duplexer.

5. The method of claim 1 further comprising positioning a gasket between the RF plate and the duplexer, wherein the gasket comprises a conductive elastomer.

6. The method of claim 1 wherein surfaces of the RF assembly in the interior of the cavity resonator are silver plated.

7. The method of claim 1 wherein the cavity resonator is manufactured from copper.

8. The method of claim 1 wherein the rod is manufactured from invar.

9. The method of claim 1 wherein the tip of the at least one set screw is fabricated from brass.

10. The method of claim 1 wherein the trimmer capacitor is a ceramic air variable capacitor.

11. The method of claim 1 wherein the trimmer capacitor is an air trimmer capacitor.

12. The method of claim 1 wherein the trimmer capacitor is a ceramic trimmer capacitor.

13. The method of claim 1 wherein the first and second RF connectors are one of N-type connectors, BNC connectors, TNC connectors, and 4.3/10 connectors.

* * * * *